United States Patent
Sikora et al.

(10) Patent No.: US 10,266,905 B2
(45) Date of Patent: Apr. 23, 2019

(54) METHOD AND APPARATUS FOR HARDENING A COMPONENT OR SEMI-FINISHED PRODUCT

(71) Applicant: THYSSENKRUPP STEEL EUROPE AG, Duisburg (DE)

(72) Inventors: Sascha Sikora, Lünen (DE); Janko Banik, Altena (DE)

(73) Assignee: thyssenkrupp Steel Europe AG, Duisburg (DE)

( * ) Notice: Subject to any disclaimer, the term of this patent is extended or adjusted under 35 U.S.C. 154(b) by 702 days.

(21) Appl. No.: 14/892,181

(22) PCT Filed: Apr. 17, 2014

(86) PCT No.: PCT/EP2014/057880
§ 371 (c)(1),
(2) Date: Nov. 18, 2015

(87) PCT Pub. No.: WO2014/187623
PCT Pub. Date: Nov. 27, 2014

(65) Prior Publication Data
US 2016/0108485 A1    Apr. 21, 2016

(30) Foreign Application Priority Data

May 24, 2013   (DE) .................. 10 2013 105 362

(51) Int. Cl.
| | |
|---|---|
| *C21D 1/18* | (2006.01) |
| *C21D 9/00* | (2006.01) |
| *C21D 1/42* | (2006.01) |
| *C21D 1/673* | (2006.01) |
| *C21D 6/00* | (2006.01) |

(52) U.S. Cl.
CPC ............... *C21D 1/18* (2013.01); *C21D 1/42* (2013.01); *C21D 1/673* (2013.01); *C21D 6/00* (2013.01); *C21D 9/0068* (2013.01); *Y02P 10/253* (2015.11)

(58) Field of Classification Search
CPC ... C21D 1/18; C21D 1/42; C21D 6/00; C21D 9/0068; C21D 1/673
See application file for complete search history.

(56) References Cited

U.S. PATENT DOCUMENTS

| | | | |
|---|---|---|---|
| 6,322,645 | B1 | 11/2001 | Dykstra |
| 2011/0011499 | A1 | 1/2011 | Lengauer |

FOREIGN PATENT DOCUMENTS

| | | |
|---|---|---|
| DE | 69705748 T2 | 12/1997 |
| DE | 10012974 C1 | 3/2001 |
| DE | 69803588 T2 | 1/2002 |
| DE | 10212820 C1 | 4/2003 |
| DE | 102004062777 A1 | 7/2006 |
| DE | 102009042387 A1 | 8/2011 |
| DE | 102011102800 A1 | 12/2011 |
| DE | 102010049640 B4 | 5/2012 |
| EP | 1672085 A1 | 6/2006 |
| EP | 2014777 A1 | 1/2009 |
| WO | 2012025171 A1 | 3/2012 |

OTHER PUBLICATIONS

International Search Report for International Patent Application No. PCT/EP2014/057880; dated Jul. 21, 2014.

*Primary Examiner* — Jessee R Roe
(74) *Attorney, Agent, or Firm* — RMCK Law Group PLC

(57) ABSTRACT

Example methods and apparatus for hardening a component or any semi-finished product formed from a steel workpiece that has been shaped in a shaping tool may involve introducing the component into a receiving region of a hardening tool. The hardening tool may then be closed around the component in a form-fitting manner so as to surround the component and maintain a substantially constant distance between the component and at least one induction coil integrated into the hardening tool. The induction coil of the hardening tool may then be used to heat the component. The component may then be cooled within the receiving region or by removing the component from the receiving region and exposing the component to air external to the receiving region.

16 Claims, 1 Drawing Sheet

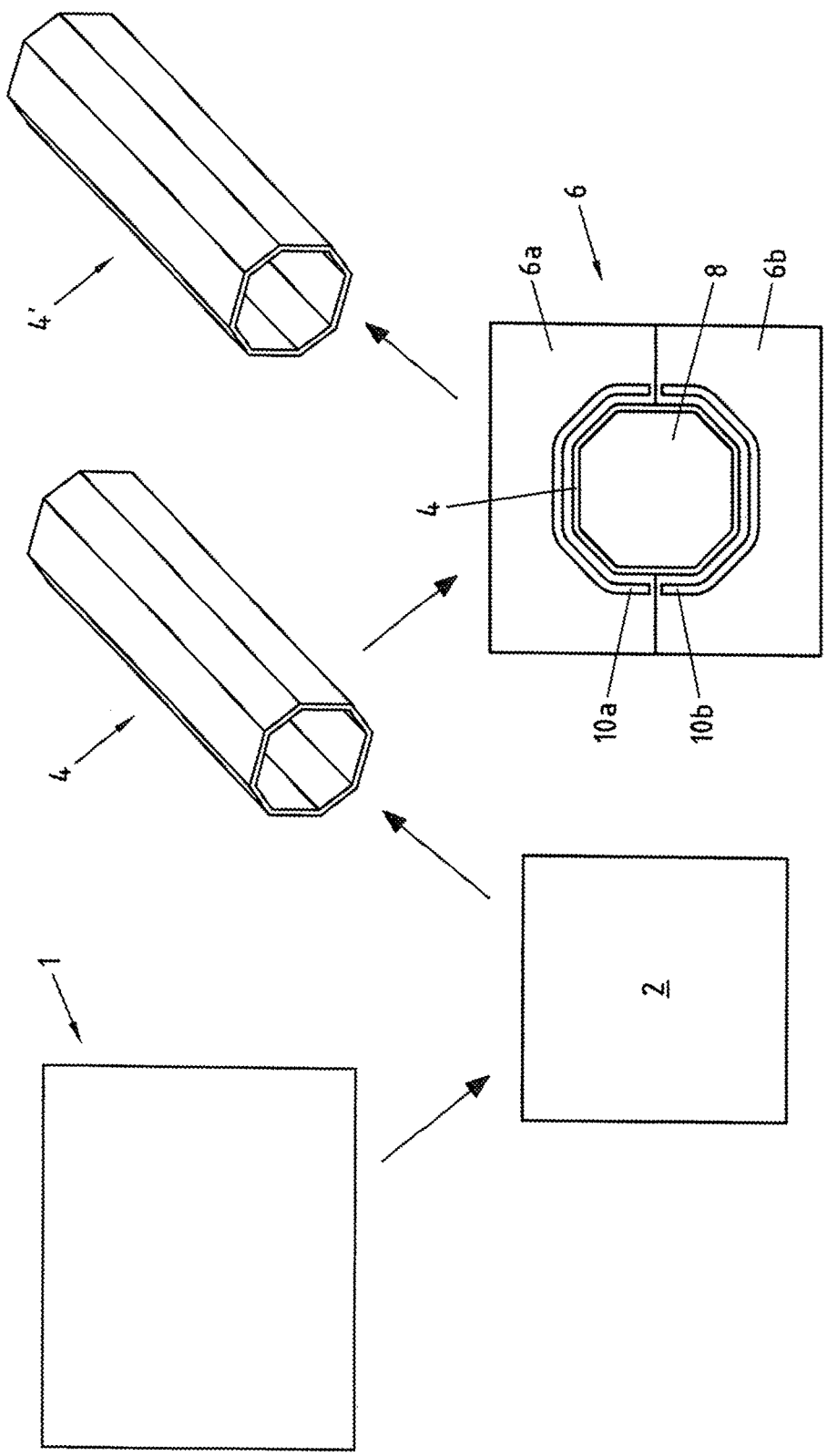

METHOD AND APPARATUS FOR HARDENING A COMPONENT OR SEMI-FINISHED PRODUCT

CROSS REFERENCE TO RELATED APPLICATIONS

This application is a U.S. National Stage Entry of International Patent Application Serial Number PCT/EP2014/057880, filed Apr. 17, 2014, which claims priority to German Patent Application No. DE 102013105362.9 filed Apr. 26, 2013, the entire contents of both of which are incorporated herein by reference.

FIELD

The present disclosure relates to methods and apparatus for hardening a component or semi-finished product made from a workpiece formed at least partially of steel.

BACKGROUND

In particular in the field of the automotive industry, even higher demands are made on the properties of the components used, above all stability and strength while having low material thicknesses, in order to achieve the greatest possible weight saving. This applies in particular for structural components of the vehicle body.

It is already sufficiently known from the prior art to subject steel components to a hardening process in order to improve their strength. In that context, a hardenable steel is brought to a temperature above the $Ac_1$ or $Ac_3$ temperature of the steel and is then cooled, in particular quenched. Thus, the structure is in any case partially first converted into an austenitic structure and then, by cooling, into a martensitic structure, such that increased strength can be achieved. It is thus possible, for example in the case of manganese-boron steels, to achieve tensile strengths of up to 2000 MPa in the hardened state.

A further approach for satisfying the demands mentioned in the introduction involves configuring the components as hollow profiles. These can for example be made from press-hardened components such as half-shells. The problem in this context, however, is that such hollow profiles can, in the case of low wall thicknesses, lead to stiffness problems. In order to counteract this, the hollow profiles can be formed as closed hollow profiles. However, if closed hollow profiles are assembled from half-shells, this increases the weight and also additional method steps are required.

In the field of the automotive industry, in the first instance relatively simple components such as side impact bars are formed as closed hollow profiles. It was possible to implement hardening simply and with sufficient quality on account of the relatively simple geometry. Over time, attempts were made to harden ever more complex components. In parts, in particular for internal parts of the vehicle body structure, components having a highly complex geometry are required.

One approach for hardening components having complex geometry consists in first heating these in an oven and then hardening them by cooling in a hardening tool. However, it was found that, in the case of more complex geometries, satisfactory hardening could not be achieved by subsequent hardening in the hardening tool. In addition, such a procedure increases the total costs of production on account of the separate process steps of forming, heating, hardening and transporting the component between these steps.

Even by heating and hardening within a tool, as is for example known from DE 100 12 974 C1 or DE 10 2009 042 387 A1, it was not possible to achieve satisfactory hardening of complex components.

The invention is thus based on the object of proposing a method and a device which will make possible, cost-effectively, a reliable hardening process for the component or semi-finished product, even in the case of complex geometries.

BRIEF DESCRIPTION OF THE FIGURE

FIG. 1 is a schematic view depicting an example method and apparatus for hardening a component or a semi-finished product.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

Example methods and apparatus are disclosed for hardening a component or semi-finished product made from a workpiece formed at least partially from steel. As one having ordinary skill in the art will recognize, the term 'component' may be used herein to refer to a semi-finished product. The workpiece may be shaped in a shaping tool to form the component or semi-finished product, wherein the component or semi-finished product is then introduced into a receiving region of a hardening tool surrounding the component or semi-finished product. The component may then be heated inductively by at least one induction coil integrated into the hardening tool. Further, the component or semi-finished product may then be hardened by cooling.

According to a first teaching of the invention, the object is achieved with a generic method in that the component or semi-finished product is introduced into the receiving region of the hardening tool in a form-fitting manner and, during heating with the hardening tool closed, an essentially constant distance is maintained between the component or semi-finished product and the at least one induction coil.

It has been observed that, on account of the temperature-dependent expansion and contraction processes during heating and cooling of the component or semi-finished product, no reliable position of the component or of the semi-finished product in the hardening tool has been established. This has had the consequence that, during the inductive heating, a different quantity of energy is transmitted to the material on account of the changing coupling distance between the component or semi-finished product and the induction coil. The resulting temperature variations lead to a differing expansion and to an undulating material surface, which in turn leads to differing distances with respect to the component or semi-finished product to be heated.

It has now been found that, if the component or semi-finished product is introduced sufficiently form-fittingly into the receiving region of the hardening tool, during heating with the hardening tool closed, an essentially constant distance can be maintained between the component or semi-finished product and the at least one induction coil. The form-fitting introduction is achieved by virtue of the fact that the geometry of the hardening tool has, in the provided contact regions between the component or semi-finished product and the hardening tool, exactly the geometry of the component or semi-finished product when the latter is introduced into the hardening tool. Areal contact between the hardening tool and the semi-finished product or component is thus ensured prior to heating of the semi-finished product or component. When introduced into the hardening tool, the component or semi-finished product is generally at a temperature below the austenitizing temperature of the steel material, for example approximately room temperature. The contact regions can be provided differently, depending on the geometry of the component. For example, the contact region is provided on both sides of a planar component or semi-finished product, or the contact region is the outer face of the component or semi-finished product, in particular in the case of a profile, such that the areal contact is easily maintained during further heating. It is thus possible, even in the case of complex and highly complex geometries, to maintain a constant distance between the component or semi-finished product and the at least one induction coil. Complex and non-complex components are distinguished by varying cross sections and/or sharply bent geometry profiles and/or large variations in component height. It is in particular possible, according to the invention, to reliably harden complex-shaped components, as are for example produced in internal high-pressure forming methods (IHP methods) but also in U-O methods. It is thus possible to maintain, during heating, full-face contact essentially between the component or semi-finished product and the hardening tool. By virtue of the form-fitting introduction, practically no relative movements—or only insignificant relative movements—take place between the component or semi-finished product and the hardening tool. It has also been found that, by splitting the forming and hardening processes over separate tools, the hardening tool can be configured such that the component or semi-finished product is introduced particularly form-fittingly into the receiving region of the hardening tool, in which essentially no further forming takes place.

Particularly advantageously, the at least one induction coil is also arranged at a constant distance from the hardening tool surface of the receiving region. The fact that the at least one induction coil follows the hardening tool surfaces at a constant distance makes it possible to achieve that for example the active faces of the hardening tool are produced as a shell or crown construction and ducts are for example milled into the rear side, or that use is made of shells which are cast in one piece and provided with ducts, into which the at least one induction coil can be inserted.

The result of this is a method which makes possible, cost-effectively, a reliable hardening process for the component or semi-finished product, even in the case of complex geometries.

If, according to one embodiment of the method according to the invention, the steel material used is an air-hardening steel and the component or semi-finished product is hardened outside the receiving region of the hardening tool by cooling in air, the process can be carried out particularly cost-effectively by virtue of dispensing with a quenching integrated into the hardening tool or with an external hardening process. Because of the very homogeneous or predictable heating of the component or semi-finished product in the hardening tool, it is possible to achieve a particularly even and precise hardening by subsequent cooling in air. Forced air cooling can also be used.

Air-hardening steels are in particular steels with high chromium contents, for example between 12 and 18 wt %. Elements such as molybdenum, manganese and/or nickel can also promote the air-hardening properties of the steel.

A particularly reliable hardening process for the component or semi-finished product, even in the case of complex geometries, can be achieved according to a next configuration of the method according to the invention if, subsequent to the heating, the component or semi-finished product within the receiving region of the closed hardening tool is hardened by cooling, in particular by means of a coolant. It is thus possible to provide a reliable hardening process also for steel, which for hardening must be cooled very rapidly, for example must be quenched. In particular, combining the heating and cooling in the hardening tool makes possible an economically advantageous method, since it is not necessary for transport to take place between these process steps.

For example, the component or semi-finished product can be cooled by the hardening tool surfaces themselves which, by virtue of the contact with the component or semi-finished product, can already ensure sufficient dissipation of the heat. It is equally possible to use a coolant such as for example gases, liquids or solids, which are for example introduced into the receiving region of the hardening tool by means of a cooling system, or also heat can be transported away from the tool faces of the hardening tool by means of a cooling system.

A manganese-boron steel, for example with a Mn—Si—Ti—B base, is particularly suitable as the steel material which is hardened by quenching and can reach very high strengths. Use can for example be made of steels of the MBW1500+AS, MBW1500+Z or MBW-K 1500 type. These steels have, after hardening, a tensile strength of at least 1500 MPa, a yield point of at least 1000 MPa and an elongation at failure $A_{80}$ of at least 5%.

According to a particularly preferred embodiment of the method according to the invention, during heating and during cooling, the component or semi-finished product is located form-fittingly in the receiving region of the hardening tool. It has in particular been found that, by virtue of the form-fitting arrangement of the component or semi-finished product, it is possible to achieve, even prior to heating, that, in spite of the expansion and contraction processes during heating and subsequent cooling of the component or semi-finished product, both during heating and during cooling with the hardening tool closed, full-face contact essentially between the entire component or semi-finished product and the hardening tool can be maintained and practically no relative movement—or only insignificant relative movement—takes place between the component or semi-finished product and the hardening tool.

During the inductive heating, stresses build up in the component or semi-finished product but, by virtue of the form-fitting arrangement of the component or semi-finished product on the hardening tool, lead to no relative movement—or only insignificant relative movement. When the component or semi-finished product is cooled or quenched, these stresses are once again dissipated without a temperature-induced contraction of the component or semi-finished product causing a loss of contact between the component or semi-finished product and the hardening tool. It is thus possible in this way to further optimize the reliable hardening process for the component or semi-finished product, even in the case of complex geometries.

If, according to a further embodiment of the method according to the invention, the cooling for hardening the component or semi-finished product takes place via the hardening tool surfaces of the receiving region and/or by means of an active cooling within the receiving region of the hardening tool, it is possible to achieve a particularly reliable hardening process, in particular for the case in which both during heating and during cooling, the component or semi-finished product is located form-fittingly in the receiving region of the hardening tool.

As already stated, a coolant can be used for cooling. Water and oil are examples of possible liquid coolants. It is however also possible to use industrial gases. As solid coolant, use can for example be made of ice or a metal core which can be used in particular in the case of components or semi-finished products in the form of hollow profiles and can be inserted into the profile.

Particularly advantageously, the method according to the invention can be used if, in accordance with a further configuration, the workpiece is cold formed, in particular by means of U-O forming or by means of roll forming techniques.

If the workpiece is previously cold formed in a forming tool to form the component or semi-finished product, no structure—or no sufficiently hardened structure—has yet been established. By virtue of the further method steps, in particular by virtue of the fact that the component or semi-finished product is introduced into the receiving region of the hardening tool in a form-fitting manner and, during heating with the hardening tool closed, an essentially constant distance is maintained between the component or semi-finished product and the at least one induction coil, it is possible to achieve, cost-effectively, a reliable hardening process for the component or semi-finished product, even in the case of complex geometries.

The component or semi-finished product is preferably formed from the workpiece by U-O forming or also by roll forming techniques, which steps are generally also carried out as cold forming. Such forming methods or techniques make it possible to produce components or semi-finished products with complex geometry. An IHP method can also be used to produce complex geometries. It is in particular also possible to produce what are termed "tailored tubes" which can for example be formed as cylindrical profiles with an increased thickness perpendicular to the longitudinal axis of the profile, as conical profiles, as closed profiles and/or as profiles with secondary elements formed thereon, to name but a few examples. During U-O forming, generally a flat blank is formed to a preformed-product (together with any secondary shaped elements provided), is shaped in a die to form a closed hollow profile and is then joined, for example welded, for example by means of laser welding. The preformed-product can for example have a V-shaped or U-shaped cross section. It is however also possible to provide other cross section shapes for the preformed-product. When carrying out the roll forming technique, generally a blank (together with any secondary shaped elements provided) is placed in a die which forms the hollow profile from the flat blank. In that context, the blank slides—provided that a shaping core is used—into a slot region between the shaping core and the die until the edges of the blank are opposite one another for welding.

It has surprisingly been found that even such highly complex geometries of above-mentioned hollow profiles can undergo satisfactory hardening with the method according to the invention.

A further embodiment of the method according to the invention provides that the workpiece is formed into an at least partially closed hollow profile, in particular a fully closed hollow profile, in particular in a four-side press. A reliable hardening process for at least partially closed hollow profiles was hitherto not possible or not sufficiently cost-effective. This is in particular the case for more complex at least partially closed hollow profiles such as for example tailored tubes. A further advantage has been found to be that, with the method according to the invention, reduced scale formation the joined (for example welded) region of the closed profiles can be achieved. By virtue of the form-fitting introduction of the component or semi-finished product into the receiving region of the hardening tool, and by virtue of the essentially constant distance, during heating, between the component or semi-finished product and the at least one induction coil, it is namely possible to achieve short heating times.

On account of the reduced scaling of the component or workpiece, it is particularly advantageously possible, according to a further embodiment of the method according to the invention, subsequent to the hardening, for blasting of the component or semi-finished product to be dispensed with. As already stated, the constant distance between the at least one induction coil and the component or tool makes it possible to achieve particularly efficient and thus short heating times, such that scale formation can be reduced, in particular in the case of uncoated components or semi-finished products. Dispensing with a blasting process makes it possible to further increase the cost-effectiveness of the method.

In principle, the inductive heating can cause essentially complete austenitization of the component or semi-finished product. However, if the inductive heating of the component or semi-finished product leads to merely localized and/or partial austenitization, it is possible according to a further configuration of the method according to the invention to provide a component or semi-finished product which matches the demandss. By virtue of a corresponding arrangement or control of the one or more induction coils, it is for example possible for only localized austenitization or partial austenitization of the component or semi-finished product to take place. For example, it is possible for the at least one induction coil to not entirely surround the component or semi-finished product.

Preferably, the component or semi-finished product has a wall thickness of at most 1.2 mm, preferably at most 1.0 mm and particularly preferably at most 0.8 mm. For components or semi-finished products, for example thin-walled profile components, the wall thickness is a decisive factor for the stiffness and stability, of the component or semi-finished product, which is to be achieved. It is therefore particularly important in the case of thin-walled components or semi-finished products to be able to achieve a reliable hardening process for the component or semi-finished product.

The components or semi-finished products produced in accordance with the method according to the invention can particularly advantageously be used as a body part for a motor vehicle, in particular as an internal structural part of the vehicle body, or can be used for production of same. A further conceivable example are also structural parts which can be used not in a motor vehicle but also in a rail vehicle or in aeronautics.

According to a second teaching, the object stated in the introduction is also achieved with a generic hardening tool in that the receiving region of the hardening tool is configured to receive the component or semi-finished product in a form-fitting manner such that, during heating with the hardening tool closed, an essentially constant distance is maintained between the component or semi-finished product and the at least one induction coil.

As already explained with reference to the method according to the invention, it has been found that, if the component or semi-finished product is introduced sufficiently form-fittingly into the receiving region of the hardening tool, during heating with the hardening tool closed, an essentially constant distance can be maintained between the component or semi-finished product and the at least one induction coil. It has been found that this is possible even for complex and highly complex geometries of the components or semi-finished products or of the receiving regions of the hardening tools. It is thus possible to maintain, during inductive heating, full-face contact essentially between the entire component or semi-finished product and the hardening tool. In addition, practically no relative movement—or only insignificant relative movement—takes place between the component or semi-finished product and the hardening tool. It has also been found that, by splitting the forming and hardening processes over separate tools, the hardening tool can be configured such that the component or semi-finished product can be introduced particularly form-fittingly into the receiving region of the hardening tool.

The result of this is a device which makes possible, cost-effectively, a reliable hardening process for the component or semi-finished product, even in the case of complex geometries.

If, according to one configuration of the device according to the invention, there is provided a cooling system for cooling the component or semi-finished product within the receiving region of the closed hardening tool by means of a coolant, both the heating and also the cooling can take place within the hardening tool, even if the form-fitting contact between the component or semi-finished product and the hardening tool surfaces of the receiving region were not sufficient to cool the component or semi-finished product sufficiently rapidly. The coolant can for example transport heat away from the hardening tool surfaces of the receiving region or can be introduced directly into the receiving region in the form of a liquid (such as water or oil), a gas or a solid (such as ice or a metal core).

Furthermore, the object is also achieved with a system having a hardening tool according to the invention and having a forming tool for forming the workpiece to form the component or semi-finished product. By splitting the forming and hardening processes over separate tools, the hardening tool can be configured such that the component or semi-finished product can be introduced particularly form-fittingly into the receiving region of the hardening tool.

The forming tool is in particular configured for cold forming the workpiece, in particular for U-O forming, for example as a 4-side press, or for forming by roll forming techniques. However, the forming tool can also be configured for other cold forming methods which are also conceivable such as for example internal high-pressure forming. In that context, the workpiece is preferably formed into an at least partially closed, in particular entirely closed hollow profile. If the component or semi-finished product is previously cold formed in a forming tool, no structure—or no sufficiently hardened structure—has yet been established. A hardening tool according to the invention allows the component or semi-finished product to be introduced into the receiving region of the hardening tool in a form-fitting manner such that, during heating with the hardening tool closed, an essentially constant distance is maintained between the component or semi-finished product and the at least one induction coil. It is thus possible to achieve, cost-effectively, a reliable hardening process for the component or semi-finished product, even in the case of complex geometries.

With reference now to FIG. 1, in a first step, a workpiece 1 shown in perspective, in the form of a cut sheet or a blank consisting of a steel material, for example a manganese-boron steel, is provided. The workpiece 1 is shaped in a schematically illustrated forming tool 2 to form an entirely closed hollow profile 4, illustrated in perspective. The forming tool is for example a 4-side press and shapes the workpiece 1, for example by means of U-O forming, to form the entirely closed, tubular hollow profile 4. Since the forming tool 2 has cold-formed the workpiece 1, the hollow profile 4 is an un-hardened semi-finished product or component. Closing of the hollow profile has for example also been carried out in the forming tool 2. For example, the hollow profile 4 was joined by means of laser beam welding along the edges, in the longitudinal direction. In this case, an essentially octagonal hollow profile has been produced. However, this is not to be understood as limiting. Rather, it is also possible for components or semi-finished products having different and in particular more complex geometries to have been produced by the forming tool 2, in particular having a longitudinally varying cross section.

The hollow profile 4 is in this case a thin-walled hollow profile with a wall thickness of less than 1.2 mm. The profile 4 is therefore not yet strong enough.

In a further step, the un-hardened hollow profile 4 is therefore introduced into the receiving region 8 of a hardening tool 6 illustrated in cross section. In that context, the receiving region 8 of the hardening tool 6 matches the hollow profile 4 such that the hollow profile 4 can be introduced in a form-fitting manner into the receiving region 8 of the hardening tool 6 and, with the hardening tool 6 closed, there results a full-face contact between the outer surface of the hollow profile 4 and the hardening tool surfaces of the receiving region 8. In this case, the hardening tool has an upper die 6a and a lower die 6b which can surround the hollow profile 4. The full-face contact is achieved by the fact that the upper die 6a and the lower die 6b exactly match the geometry of the hollow profile 4 when the latter is placed in the hardening tool 6.

In the hardening tool 6, one induction coil 10a and, respectively 10b is integrated into each of the upper die 6a and the lower die 6b. In that context, these induction coils 10a, 10b are integrated such that the induction coils 10a, 10b are at an essentially constant distance from the hardening tool surfaces of the receiving region 8 and from the hollow profile 4 placed in the receiving region 8 and essentially entirely surround the hollow profile 4. The induction coils 10a, 10b can be used to bring the hollow profile to the austenitizing temperature, that is to say at least to the $Ac_1$ or $Ac_3$ temperature. Because the hollow profile 4 is introduced form-fittingly into the receiving region 8, it is possible, during heating with the hardening tool 6 closed, for an essentially constant distance to be maintained between the hollow profile 4 and the induction coils 10a, 10b. By virtue of the homogeneous and efficient heating, it is in particular possible for scaling in the join region of the hollow profile 4 to be reduced.

In the event that the hollow profile 4 consists of an air-hardening steel, the hollow profile can then be removed from the hardening tool 6 and hardened by air cooling, so as to provide the hardened hollow profile 4'.

In the event that the hollow profile consists of a steel which, for hardening, requires a more rapid rate of cooling, for example a manganese-boron steel, it is possible for the hollow profile to be cooled, subsequent to heating, within the receiving region 8 of the closed hardening tool 6, without opening the hardening tool 6. In this context, it can already be sufficient that the hollow profile 4 is no longer heated by the induction coils 10a, 10b and the contact with the upper and lower dies 6a, 6b is sufficient to cool the hollow profile 4 sufficiently rapidly. It is however also possible for an additional liquid, gaseous or solid coolant (not shown) to be provided, which coolant absorbs and/or removes the heat. By virtue of the fact that the hollow profile 4 is located form-fittingly in the receiving region 8 of the hardening tool 6 both during heating and during cooling, it is possible for both steps to be carried out very reliably, thus making possible, cost-effectively, a reliable hardening process for the hollow profile 4, even in the case of complex geometries. After cooling the hollow profile 4 in the hardening tool 6, the hardened hollow profile 4' can be made available.

What is claimed is:

1. A method for hardening a component formed from a steel workpiece that has been shaped in a shaping tool, the method comprising:
    introducing the component into a receiving region of a hardening tool;
    closing the hardening tool around the component so as to surround the component in a form-fitting manner and maintain a substantially constant distance between the component and at least one induction coil integrated into the hardening tool;
    heating the component inductively by the at least one induction coil; and
    cooling the component, wherein the step of cooling the component comprises using a coolant to cool the component within the receiving region of the hardening tool while the hardening tool is closed around the component, wherein the step of cooling takes place via at least one of surfaces of the receiving region of the hardening tool or an active cooling element of the receiving region of the hardening tool.

2. The method of claim 1 wherein the steel workpiece is an air hardening steel, wherein the step of cooling the component comprises removing the component from the receiving region of the hardening tool and exposing the component to air external to the receiving region.

3. The method of claim 2 further comprising maintaining the component within the receiving region of the hardening tool in the form-fitting manner during the steps of heating and cooling.

4. The method of claim 1 further comprising forming the steel workpiece into an at least partially-closed hollow profile by way of a four-side press.

5. The method of claim 1 wherein the step of inductively heating the component causes only localized austenitization or partial austenitization in the steel workpiece.

6. The method of claim 1 wherein the steel workpiece has a wall thickness of at most 1.2 mm.

7. The method of claim 1 wherein the steel workpiece has a wall thickness of at most 1.0 mm.

8. The method of claim 1 wherein the steel workpiece has a wall thickness of at most 0.8 mm.

9. A method for hardening a component formed from a steel workpiece that has been shaped in a shaping tool, the method comprising:
    cold forming the steel workpiece by U-O forming or a roll forming technique to provide the component;
    introducing the component into a receiving region of a hardening tool;
    closing the hardening tool around the component so as to surround the component in a form-fitting manner and maintain a substantially constant distance between the component and at least one induction coil integrated into the hardening tool;
    heating the component inductively by the at least one induction coil; and
    cooling the component.

10. The method of claim 9 wherein the steel workpiece is an air hardening steel, wherein the step of cooling the component comprises removing the component from the receiving region of the hardening tool and exposing the component to air external to the receiving region.

11. The method of claim 10 further comprising maintaining the component within the receiving region of the hardening tool in the form-fitting manner during the steps of heating and cooling.

12. The method of claim 9 further comprising forming the steel workpiece into an at least partially-closed hollow profile by way of a four-side press.

13. The method of claim 9 wherein the step of inductively heating the component causes only localized austenitization or partial austenitization in the steel workpiece.

14. The method of claim 9 wherein the steel workpiece has a wall thickness of at most 1.2 mm.

15. The method of claim 9 wherein the steel workpiece has a wall thickness of at most 1.0 mm.

16. The method of claim 9 wherein the steel workpiece has a wall thickness of at most 0.8 mm.

* * * * *